United States Patent [19]

Roe et al.

[11] 4,184,695

[45] Jan. 22, 1980

[54] MOTORCYCLE FRONT FORK ASSEMBLY

[75] Inventors: Geoffrey E. Roe; Terrance E. Thorpe, both of Stockport, England

[73] Assignee: Victoria University of Manchester, Manchester, England

[21] Appl. No.: 910,426

[22] Filed: May 30, 1978

[30] Foreign Application Priority Data

Jun. 4, 1977 [GB] United Kingdom ............... 23836/77

[51] Int. Cl.² ............................................. B62K 21/02
[52] U.S. Cl. ................................................... 280/277
[58] Field of Search ......................................... 280/277

[56] References Cited

FOREIGN PATENT DOCUMENTS

| | | | |
|---|---|---|---|
| 474575 | 6/1951 | Canada ................................... | 280/277 |
| 824866 | 12/1959 | United Kingdom ..................... | 280/277 |
| 841,523 | 7/1960 | United Kingdom ..................... | 280/277 |

*Primary Examiner*—John P. Silverstrim
*Attorney, Agent, or Firm*—Robert L. Stone

[57] ABSTRACT

Flutter and weave instability of a motorcycle front fork assembly is substantially reduced by achieving an overall lateral stiffness of the fork assembly mounts of at least 1000 lbs./in. This is done by providing an assembly including a pair of fork legs, each having a minimum flexural rigidity of $10.8 \times 10^6$ lbs.-in²; a pair of rotational bearings attached to the base of each leg, each bearing carrying a suspension link having a minimum flexural rigidity of $3.8 \times 10^6$ lbs.-in²; a wheel spindle having a minimum rigidity of $1.9 \times 10^6$ lbs.-in²; and resilient suspension means. The fork legs are substantially parallel to each other and extend downwardly from a steering head. The rotational bearings have negligible radial clearance. The suspension links extend forwardly from the rotational bearings and are mounted to the associated leg of each. The wheel spindle is rigidly clamped and extends between the free ends of the suspension links. The resilient suspension means extend between each fork and its suspension link.

12 Claims, 3 Drawing Figures

MOTORCYCLE FRONT FORK ASSEMBLY

This invention relates to a motorcycle front fork assembly.

An increase in the popularity of motorcycles has drawn attention to the principal areas of inherent instability in motorcycle design. In particular, there is a need to improve the degree of control available to the rider, and especially his ability to steer the machine in a chosen path. One critical area in the steering control is the ability of the machine to travel in a straight line at all speeds and under all load conditions. Motorcycles suffer from two fundamental kinds of steering instability. One of these occurs at a speed of around 40 mph and is characterised by a flapping of the handle bars at about 8 Hz. The other occurs at over 80 mph when the whole machine undergoes a snaking or weaving movement at about 3 Hz. These conditions are known respectively as "flutter" and "weave." Both are increased in severity by carrying tail luggage, but improved by the damping effect of a pillion passenger. Flutter and weave are caused by the same mechanical problems which beset a caster where the contact patch with the running surface is other than immediately below the steering axis. Under adverse conditions the axis will oscillate about a straight line. A motorcycle can be likened in this respect to a pair of casters joined together at the steering head. The front fork assembly suffers more acutely from this inherent oscillation, and it is believed that the most significant factor affecting the instability of the front forks is the lateral stiffness thereof which is measured as the resistance provided by the fork assembly to sideways deflection of the front wheel at the lowest point on the wheel rim, with the assembly held stationary at its upper end. The correct design of front forks is therefore important in an excercise to increase the lateral stiffness.

Two main types of front fork assembly which are in current use are known as telescopic forks and leading link forks respectively.

The telescopic forks comprise two parallel legs each formed as a pair of concentric tubular members having resilient suspension means acting between the two, and a wheel spindle is rigidly connected to and extends between the lower ends of the two legs. For there to be sufficient clearance between the concentric members of each leg for relative telescopic movement, there must also be some degree of relative lateral movement which inevitably permits axial movement of the wheel spindle. Therefore lateral stiffness is greatly impaired.

In the leading link fork arrangement a pair of parallel rigid, and usually tubular, legs are provided, and the wheel spindle is connected thereto by a pair of suspension links which are pivotally attached to the lower ends of the legs. Suspension springs are connected at their ends to points part-way along the suspension links and the legs respectively. In this case therefore the only relative movement of parts of the assembly to provide the suspension, is at the pivotal connection of the suspension links and the fork legs. It was therefore thought that lateral stiffness could be improved in leading link forks more readily than in the telescopic arrangement.

An object of the invention is to provide a motorcycle front fork assembly wherein overall lateral stiffness is improved in relation to present designs. The stiffness is measured by applying a load at the lowest point on the wheel rim with the wheel clear of the ground, the direction of the load being at right angles to the wheel plane, and measuring the resultant deflection in the direction of the load at the point of load application, the steering head assembly at the upper ends of the forks being fixed against movement and being the datum of the deflection measurement.

In the following statement and throughout the specification, the term "flexural rigidity" shall be defined as the product of Young's Modulus and the second moment of area.

Thus, according to the present invention there is provided a motorcycle front fork assembly including a pair of substantially parallel fork legs extending downwardly from a steering head and each having a minimum flexural rigidity of $10.8 \times 10^6$ pounds inches squared; a pair of rotational bearings each at the base of each leg having negligible radial clearance; and each rotational bearing carrying a forwardly extending suspension link thus pivotally mounted with respect to its associated leg, each suspension link having a minimum flexural rigidity of $3.8 \times 10^6$ pounds inches squared; a wheel spindle rigidly clamped by and extending between the free ends of the suspension links and having a minimum flexural rigidity of $1.9 \times 10^6$ pounds inches squared; and resilient suspension means extending between each fork leg and the associated suspension link, all whereby the overall lateral stiffness of the fork assembly amounts to at least 1000 pounds per inch.

Two embodiments of the invention will now be described, by way of example only, with reference to the accompanying drawings in which.

Figure 1:
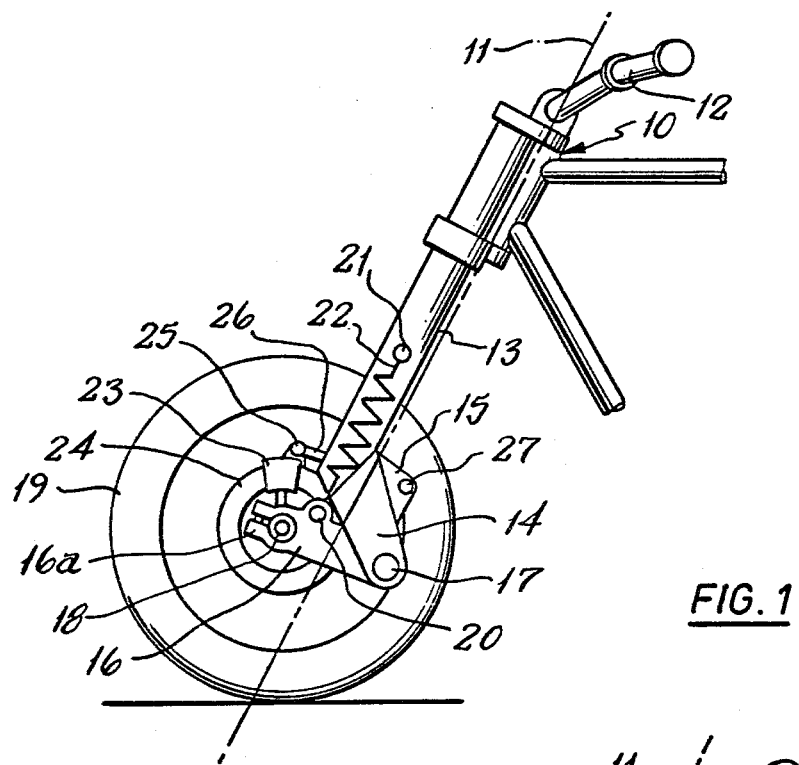
FIG. 1 shows, schematically a front fork assembly having resilient suspension means a major portion of which is enclosed within the fork legs themselves.

Referring now to FIG. 1, the assembly comprises a steering head generally indicated at 10 being part of the overall frame of the motorcycle. Thus a steering axis indicated by the line 11 is generated so that the front wheel may be steered by handle bars 12 about the axis 11. The assembly further comprises a pair of tubular fork legs 13 extending in a downwardly inclined direction from the steering head 10. The base of each leg 13 carries a pair of rearwardly inclined parallel flat plates 14 having lugs 15 extending rearwardly thereof adjacent the lower end of the associated leg 13. Each pair of plates 14 carries therebetween a suspension link 16 which is pivotally attached thereto by means of a pair of pre-loaded taper roller bearings 17 placed back-to-back. By this arrangement, whilst the links 16 may pivot freely on the aligned axes of the bearings 17 there is negligible radial clearance in the bearings so that movement of the links 16 normal to the axes of the bearings is prevented. The free end of each link 16 is formed as an open ended clamp 16a in which is rigidly held the wheel spindle 18 which thus extends between the links 16 and supports the wheel 19 between the forks. The rotational bearings may each comprise a pair of pre-loaded taper roller bearings placed back-to-back.

Disposed between a point 20 part-way along each link 16, and a point 21 part-way along the associated leg 13, is a suspension device 22 which, in the conventional way, consists of a compression spring and damper unit and is illustrated schematically in the drawings as a coil spring.

In FIG. 1 there is shown a disc brake assembly 23 which is freely pivotally mounted on the wheel spindle 18 and acts on a disc 24. The assembly 23 is pivotally attached at 25 to a torque arm 26 whose other end is pivotally attached at 27 to the lugs 15 on the plates 14.

The pivots 25 and 27, together with the axes of the wheel spindle 18 and bearing 17, define a parallelogram such that the links 16 may pivot about the axis of the bearings 17 to permit compression of the suspension device 22 under running conditions.

Figure 2:
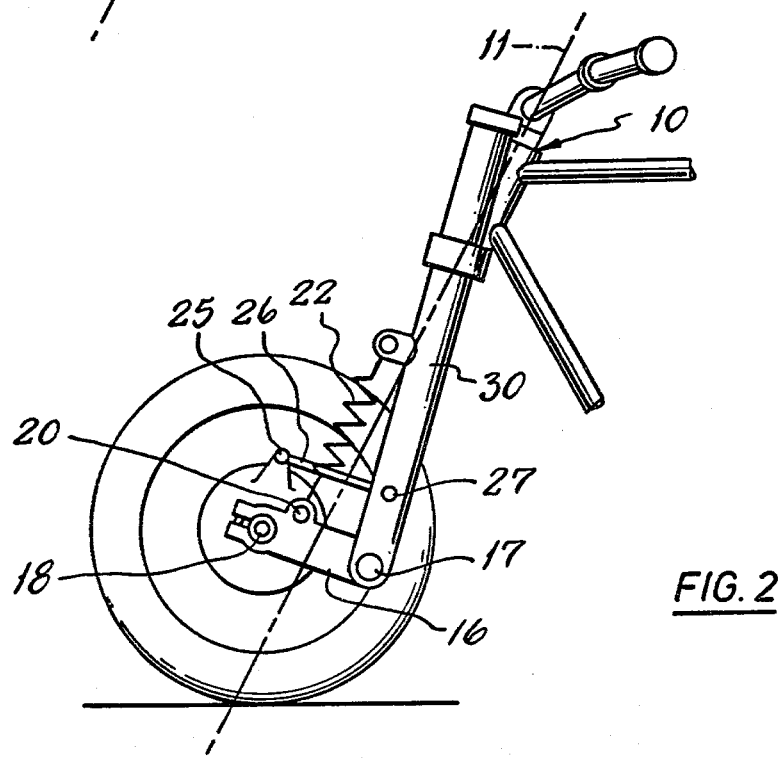
FIG. 2 is an arrangement similar to FIG. 1 except that the suspension means is disposed forwardly of the fork legs.

Referring now to FIG. 2, it will be seen that in another embodiment there is provided a pair of fork legs 30 which are inclined with respect to the steering axis 11 as opposed to parallel thereto as in the embodiment of FIG. 1. In this embodiment, the suspension device 22 is disposed forward of the fork legs 30 and extends from a position on the wall thereof to the point 20 on the suspension links 16. If required, as an alternative arrangement, the legs 30 can extend parallel to the axis 11 between the steering head 10 and the point at which the suspension device 22 is attached, and can be angled rearwardly from that point towards their lower ends whereat they are attached to the bearings 17.

In the embodiment of FIG. 2, a drum brake assembly is schematically illustrated as an alternative to the disc brake assembly of FIG. 1. In this case, the brake assembly is again pivotally attached at 25 to the torque arm 26, although the other end of the torque arm is pivotally attached at 27 to the associated fork leg 30 above the bearing 17.

Again, the pivots 25 and 27 together with the axes of the spindle 18 and bearing 17 define a parallelogram, so that the suspension device 22 may be compressed under running conditions.

In order to obtain the required lateral stiffness of the assembly, in both embodiments of FIGS. 1 and 2, the fork legs are preferably made of mild steel or alloy tube of circular cross section and essentially having a minimum flexural rigidity of $10.8 \times 10^6$ pounds inches squared. This rigidity is achieved by using a tube of greater diameter and thinner wall than is usual in motorcycle front forks. For example, the diameter may be in the region of $2\frac{1}{2}$ inches and the wall thickness may be 16 gauge. The suspension links 16 which are maintained as short as possible are preferably of solid construction such as an alloy and essentially have a minimum flexural rigidity of $3.8 \times 10^6$ pounds inches squared. The links 16 are constrained to move together by the wheel spindle 18 which is rigidly clamped around its circumference between the links. Finally the wheel spindle itself is preferably made of stainless or plated steel or alloy tube and essentially has a minimum flexural rigidity of $1.9 \times 10^6$ pounds inches squared. The rigidity of the spindle is achieved by employing a diameter of approximately $1\frac{1}{4}$ inches, which is greater than is usual in motorcycle design, and to ensure the lowest possible weight, the spindle is tubular having a wall thickness of approximately $\frac{1}{4}$ inch.

Consequently, the parts are so designed and constructed that their mass is maintained as low as possible whilst the overall lateral stiffness of the assembly is at least 1000 pounds per inch. This stiffness figure is approximately twice that of typical telescopic forks, and thus provides greater stability and control against flutter and weave than any known assembly. Also maintained is the inherent advantage of leading link forks when compared with telescopic forks, in that compression and relaxation of the suspension is smoothed by the absence of any sliding movement between the parts of the assembly.

Figure 3:
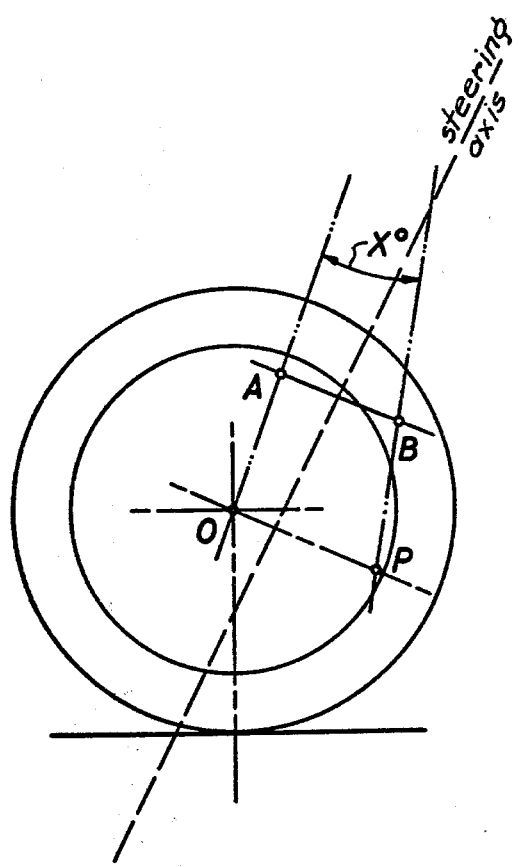
FIG. 3 is a diagrammatic representation of the pivotal interconnection of the principal parts of the assembly in a particular arrangement to provide an additional advantageous feature.

With reference to FIG. 3 of the drawings and the following description, it will be seen that by rearrangement of the positions of the pivots 25 and 27 and the axes of the wheel spindle 18 and bearing 17 the suspension device 22 can be effectively stiffened during braking thus preventing excessive compression of the suspension under braking action when the weight of the rider is transferred forwards onto the front forks. In FIG. 3, the pivots 25 and 27 are represented respectively by the letters A and B and the axes of the wheel spindle 18 and bearing 17 by points O and P. However, the points A and B are moved closer together than the pivots 25 and 27 so that a line drawn between the points ABOP no longer forms a parallelogram. Thus the lines AO and BP are no longer parallel and define an angle illustrated here as X.

As the line AB is now shorter than the line OP, when the point O is raised, i.e. when the suspension is compressed, then the line AO rotates clockwise about point P so that the angle X increases. Under braking torque, this line AO which represents a line between the brake pivot 25 and wheel spindle 18 is subjected to a force which tends to rotate the line anti-clockwise about a point P, thus tending to reduce the angle X. Therefore, as X increases when the suspension is compressed then a force tending to reduce X opposes the compression and causes the suspension to be stiffened against weight transfer under braking. It will be appreciated that the geometry of the body represented by the points ABOP can be arranged in any convenient manner which permits the line AO to change its angle with respect to the line BP. Reduction of the length of the line AB was chosen as the lines BP,PO and AO represent parts of the assembly which are not so readily modified as is the length of the torque arm 26.

The feature just described is not achieved when AB OP is a parallelogram where it is impossible for the lines AO and BP to be other than parallel. Preferably the length of the torque arm 26 is adjustable to enable adjustment of the resistance to suspension compression under braking.

It is not intended to limit the invention to the above examples only, many variations, such as might readily occur to one skilled in the art, being possible without departing from the scope of the invention.

For example, the fork legs 13 and 30 can be other than tubular provided that the minimum required flexural rigidity is maintained. Furthermore, the wheel spindle 18 can be of similar diameter and of solid construction, again provided that the minimum required flexural rigidity is maintained and that the member remains as light as possible. It is important to ensure that there is a high flexural rigidity of the parts of the assembly whilst the overall weight is maintained as low as possible.

What we claim is:

1. A motorcycle front fork assembly including a pair of substantially parallel fork legs extending downwardly from a steering head and each having a minimum flexural rigidity of $10.8 \times 10^6$ pounds inches squared; a pair of rotational bearings each at the base of each leg having negligible radial clearance and each rotational bearing carrying a forwardly extending suspension link thus pivotally mounted with respect to its associated leg, each suspension link having a minimum flexural rigidity of $3.8 \times 10^6$ pounds inches squared; a wheel spindle rigidly clamped by and extending between the free ends of the suspension links and having a minimum flexural rigidity of $1.9 \times 10^6$ pounds inches squared; and resilient suspension means extending between each fork leg and the associated suspension link, all whereby the overall lateral stiffness of the fork assembly amounts to at least 1000 pounds per inch.

2. A motorcycle front fork assembly according to claim 1, wherein said rotational bearings each comprise a pair of pre-loaded taper roller bearings placed back-to-back.

3. A motorcycle front fork assembly according to claim 1, wherein said suspension links each comprise a member of solid construction having clamping means at its end remote from its pivotal connection to said fork leg, the clamping means for receiving and rigidly clamping the wheel spindle in an end region thereof.

4. A motorcycle front fork assembly according to claim 3, wherein the wheel spindle is tubular and clamped around its circumference by the suspension links.

5. A motorcycle front fork assembly according to claim 1, wherein the fork legs are tubular and a major part of the suspension means is disposed within the fork legs.

6. A motorcycle front fork assembly according to claim 1, wherein said resilient suspension means is disposed forwardly of said fork legs and extends parallel to a steering axis generated by the steering head.

7. A motorcycle front fork assembly according to claim 1, including a brake assembly mounted for free rotation about the wheel spindle, there being a rigid torque arm pivotally attached to and extending between a point on the brake assembly radially displaced from the wheel spindle, and a point fixed with respect to the fork legs, such that, upon pivotal movement of the suspension links relative to the fork legs, a line extending between the axis of the wheel spindle and the axis of the pivotal connection between the brake assembly and the torque arm is caused to rotate about the aligned axes of the bearings between the fork legs and the suspension links, whereby, in use, application of braking torque generates a force which opposes pivotal movement of the suspension link to compress the suspension means.

8. A motorcycle front fork assembly according to claim 7, wherein the length of said torque arm is adjustable to adjust the extent of opposition to suspension compression under braking torque.

9. A motorcycle front fork assembly according to claim 1, wherein said wheel spindle carries a disc brake assembly.

10. A motorcycle front fork assembly according to claim 1, wherein said wheel spindle carries a drum brake assembly.

11. A motorcycle front fork assembly according to claim 1, wherein the front forks are disposed parallel to a steering axis generated by the steering head.

12. A motorcycle front fork assembly according to claim 1, wherein the fork legs are, at least in part, inclined with respect to a steering axis generated by the steering head.

* * * * *

UNITED STATES PATENT AND TRADEMARK OFFICE
CERTIFICATE OF CORRECTION

PATENT NO. : 4,184,695

DATED : January 22, 1980

INVENTOR(S) : Geoffrey E. Roe and Terence E. Thorpe

It is certified that error appears in the above-identified patent and that said Letters Patent are hereby corrected as shown below:

Cover page, First column [75], please correct the spelling of the first name of the second inventor to read --Terence--.

Signed and Sealed this

Seventeenth Day of June 1980

[SEAL]

Attest:

Attesting Officer

SIDNEY A. DIAMOND

Commissioner of Patents and Trademarks